(12) United States Patent
Thor

(10) Patent No.: US 7,591,756 B2
(45) Date of Patent: Sep. 22, 2009

(54) CLUTCH TO CLUTCH TIE-UP STEADY-STATE DIAGNOSTIC

(75) Inventor: Todd J. Thor, Byron, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 407 days.

(21) Appl. No.: 11/671,979

(22) Filed: Feb. 6, 2007

(65) Prior Publication Data

US 2008/0185251 A1  Aug. 7, 2008

(51) Int. Cl.
*B60W 10/02* (2006.01)
*B60W 10/00* (2006.01)
*B60W 10/04* (2006.01)
*F16H 61/16* (2006.01)
*F16H 61/18* (2006.01)
*G06F 7/00* (2006.01)
*G06F 17/00* (2006.01)

(52) U.S. Cl. .............. 477/70; 477/125; 477/174; 477/906; 701/62

(58) Field of Classification Search ............. 477/70, 477/125, 174, 180, 906; 701/62, 67
See application file for complete search history.

(56) References Cited

U.S. PATENT DOCUMENTS 7,421,326 B2 * 9/2008 Thor et al. ............ 701/67
2007/0249463 A1 * 10/2007 Thor et al. ............ 477/70

* cited by examiner

*Primary Examiner*—Tisha D Lewis

(57) ABSTRACT

A method of regulating operation of an automatic transmission includes identifying a tie-up condition of the automatic transmission, adjusting a pressure of a transmission element in response to the tie-up condition and determining whether a first gear ratio of the automatic transmission holds. The pressure is set to zero if the gear ratio does not hold and a faulty transmission element is identified as one associated with a second gear ratio that is lower than said first gear ratio.

15 Claims, 3 Drawing Sheets

CLUTCH TO CLUTCH TIE-UP STEADY-STATE DIAGNOSTIC

FIELD

The present disclosure relates to a transmission that is driven by a prime mover, and more particularly to a transmission clutch control to identify a clutch that is inducing a tie-up condition.

BACKGROUND

The statements in this section merely provide background information related to the present disclosure and may not constitute prior art.

Traditionally, vehicles include a prime mover, such as an internal combustion engine, that generates drive torque. The drive torque is transferred through a powertrain to drive a drivetrain, propelling the vehicle along a surface. Exemplary powertrain components include a transmission and a coupling device, through which the drive torque from the engine is transferred to the transmission. The transmission multiplies the drive torque by a gear ratio and further transfers the multiplied drive torque to the driveline.

An exemplary transmission includes an automatic transmission having a plurality of transmission elements that are hydraulically engaged to establish a desired gear ratio. Accordingly, each transmission element includes a corresponding hydraulic circuit having a variable bleed solenoid (VBS) to regulate the actuation pressure of a corresponding transmission element, as well as brake switches and pressure switches.

A transmission tie-up condition can occur when a transmission element engages at an inappropriate time. More specifically, in so called clutch to clutch type transmissions, a gear ratio shift is orchestrated by lowering the torque transfer capacity of an off-going (i.e., disengaging) clutch while increasing the torque transfer capacity of an on-coming (i.e., engaging) clutch. In the event that a third or redundant clutch should be applied during steady-state conditions, the vehicle decelerates at a rate that is proportional to the torque transfer capacity that the offending clutch comes on with.

Accordingly, traditional diagnostic routines are implemented in transmission systems to identify the offending clutch upon detection of a tie-up condition. More specifically, traditional diagnostic routines cycle through and diagnose the various control elements (e.g., VBS, pressure switches, brake switches) to identify the offending element and to correct the tie-up condition. These traditional diagnostic routines, however, can result in false detection of tie-up conditions and can induce vibrations or other phenomenon that can be sensed by the driver.

SUMMARY

Accordingly, the present disclosure provides a method of regulating operation of an automatic transmission. The method includes identifying a tie-up condition of the automatic transmission, adjusting a pressure of a transmission element in response to the tie-up condition and determining whether a first gear ratio of the automatic transmission holds. The pressure is set to zero if the gear ratio does not hold and a faulty transmission element is identified as one associated with a second gear ratio that is lower than said first gear ratio.

In other features, the method further includes setting a pressure of the transmission element to a value just below a slip pressure of the transmission element if the first gear ratio holds and again determining whether the first gear ratio of the automatic transmission holds. The pressure is set to zero if the gear ratio does hold and a faulty transmission element is identified as one associated with a second gear ratio that is higher than the first gear ratio. The pressure is set to an engagement pressure if the gear ratio does not hold and a no fault condition of the automatic transmission is indicated.

In still another feature, the adjusting of the pressure includes determining a slip pressure of the transmission element, determining an offset pressure and setting the pressure of the transmission element to the slip pressure plus the offset pressure.

In yet another feature, the method further includes monitoring a transmission input shaft speed, monitoring a transmission output shaft speed and identifying the tie-up condition based on the transmission input shaft speed and the transmission output shaft speed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
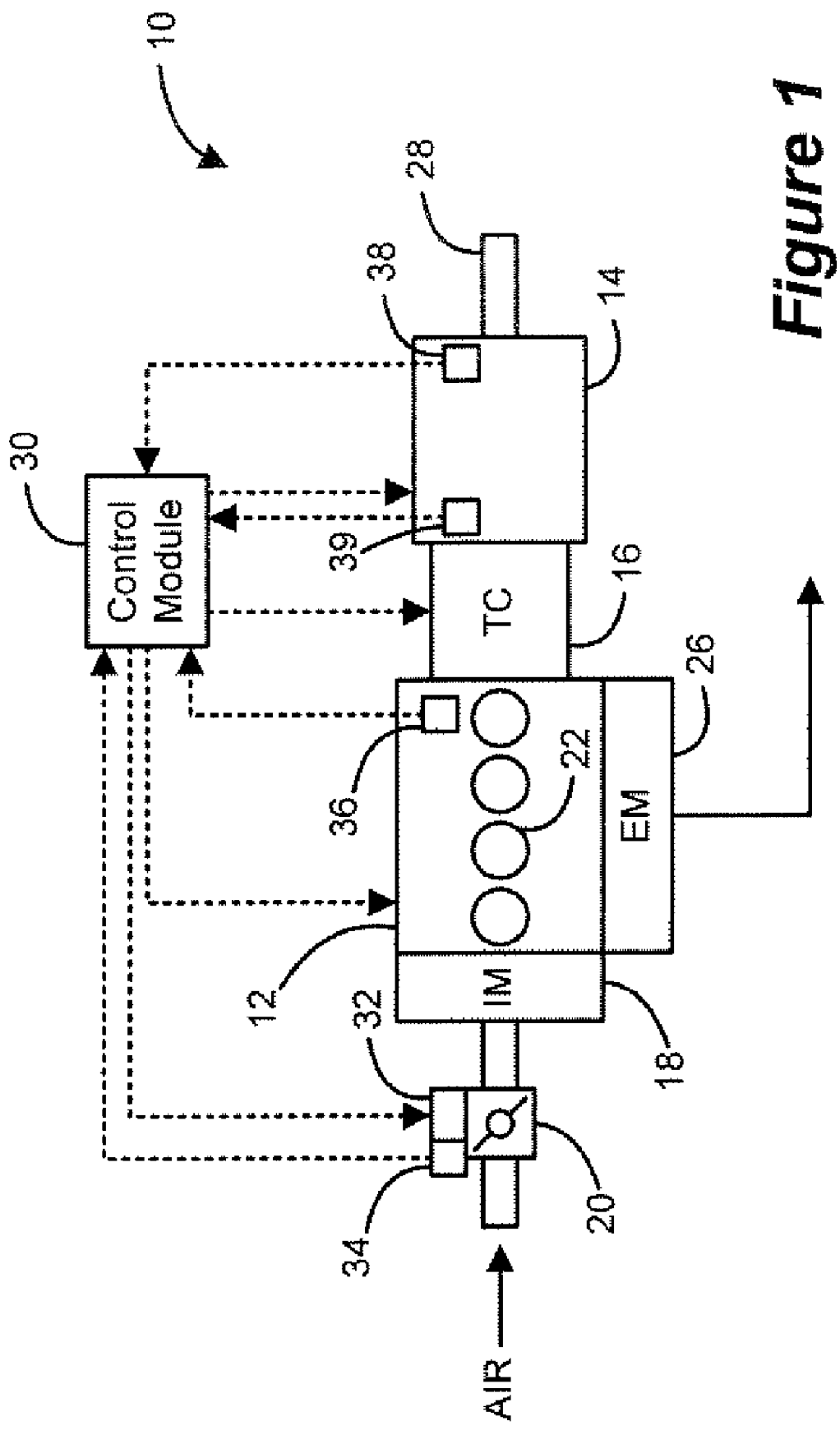
FIG. 1 is a functional block diagram of an exemplary vehicle powertrain that is regulated based on the transmission clutch control of the present disclosure.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary powertrain 10 is illustrated and includes an engine 12 that drives a transmission 14 through a coupling device 16. More specifically, air is drawn into an intake manifold 18 of the engine 12 through a throttle 20. The air is mixed with fuel and the air/fuel mixture is combusted within cylinders 22 to reciprocally drive pistons (not shown) within the cylinders 22. The pistons rotatably drive a crankshaft (not shown) to provide drive torque. Exhaust generated by the combustion process is exhausted from the engine through an exhaust manifold 26. Although 4 cylinders are illustrated, it is appreciated that the present invention can be implemented in vehicles having any number of cylinders.

The drive torque drives is transferred through the coupling device 16 to drive the transmission 14. The transmission 14 multiplies the drive torque by a desired gear ratio to provide a modified drive torque. The modified drive torque is transferred to a vehicle driveline (not shown) by a transmission output shaft 28. The transmission 14 includes an automatic transmission that provides a plurality of pre-defined, fixed gear ratios, wherein shifting of the transmission 14 is automatically regulated based on a selected drive range (e.g., P, R, N, D, L), a vehicle speed ($V_{VEH}$) and an engine load.

A control module 30 regulates operation of the powertrain based on vehicle operating parameters. More specifically, the control module 30 regulates an effective throttle area ($A_{EFF}$) via a throttle actuator 32. A throttle position sensor 34 generates a throttle position signal (TPS) based on the angular position of the throttle 20. The control module 30 determines a requested engine torque ($T_{ENG}$) and adjusts the throttle position and other engine operating parameters to achieve $T_{ENG}$. The other engine operating parameters include, but are not limited to, a fueling rate, spark timing, a camshaft phase and/or an intake/exhaust valve lift or timing.

The control module 30 also regulates operation of the transmission 14 based on vehicle operating parameters. More specifically, a crankshaft position sensor 36 generates a crankshaft position signal, which is used to determine an actual engine speed ($RPM_{ENG}$). A transmission output shaft speed (TOSS) sensor 38 generates a TOSS signal, which is used to determine $V_{VEH}$, and a transmission input shaft speed (TISS) sensor 39 generates a TISS signal.

For the purpose of the present description, an exemplary 6-speed automatic transmission will be briefly described. It is anticipated, however, that the transmission slip control of the present invention can be implemented with any type of transmission know in the art. The exemplary 6-speed automatic transmission includes four clutches C1-C4 and a brake element B1, each of which is hydraulically actuated via a corresponding hydraulic circuit. C1-C4 and B1 are selectively implemented in pairs to establish 6 forward gear ratios and a reverse ratio, in accordance with Table 1, below:

TABLE 1

|    | $1^{st}$ | $2^{nd}$ | $3^{rd}$ | $4^{th}$ | $5^{th}$ | $6^{th}$ | R |
|----|----|----|----|----|----|----|---|
| C1 | X  | X  | X  | X  |    |    |   |
| C2 |    | X  |    |    |    | X  |   |
| C3 |    |    | X  |    | X  |    | X |
| C4 |    |    |    | X  | X  | X  |   |
| B1 | X  |    |    |    |    |    | X |

Accordingly, two transmission elements (i.e., C1-C4 and B1) are actuated to establish a desired gear ratio.

During a gear shift, one of the two transmission elements remains actuated while the other transmission element gradually disengages (i.e., is off-going) and a third transmission element gradually engages (i.e., is on-coming). For example, in $1^{st}$ gear, C1 and B1 are engaged. During an upshift to $2^{nd}$ gear, C1 remains engaged and is considered the primary element. B1 gradually disengages while C2 gradually engages. Because C2 is the on-coming element for $2^{nd}$ gear, it is considered the secondary element for an up-shift to $2^{nd}$ gear. Similarly, C1 remains engaged (i.e., is the primary element), C2 gradually disengages and C3 gradually engages during an upshift to $3^{rd}$ gear. Accordingly, C3 is the secondary element for an up-shift to $3^{rd}$ gear.

The transmission clutch control of the present invention determines whether a tie-up condition exists during steady-state condition. A steady-state condition exists when there are no driver induced transients including, but not limited to, vehicle acceleration/deceleration and a gear shift. The TISS and TOSS signals are monitored while the transmission is operating in steady-state. If the both the TISS and TOSS signals remain constant, there is no tie-up condition. If the TISS signal remains constant and the TOSS signal decreases (i.e., the torque transfer to the driveline is decreasing), a tie-up condition is present.

Upon identifying the tie-up condition, the transmission clutch control reduces the pressure of the secondary element ($P_{SEC}$) to a learned clutch slipping pressure ($P_{SLIP}$) plus an offset ($P_{OFFSET}$). $P_{SLIP}$ is just insufficient to maintain the secondary element in the fully-engaged state, resulting in clutch slip. $P_{OFFSET}$, however, maintains $P_{SEC}$ sufficiently above $P_{SLIP}$ to prevent slipping of the secondary element. $P_{SLIP}$ can be determined from a look-up table based on the particular secondary element. The look-up table is preferably continuously updated throughout the lifetime of the transmission to account for component wear. $P_{OFFSET}$ is provided as a pre-stored value.

If the gear ratio does not hold upon decreasing $P_{SEC}$ (i.e., the TOSS continues to decelerate), the offending element is one that is associated with a lower gear ratio. $P_{SEC}$ is reduced to zero (i.e., 0 kPA), which effectively results in a gear ratio shift to a lower gear ratio. The transmission clutch control can identify the offending element. More specifically, when $P_{SEC}$ is rapidly dropped, the faulted gear ratio is sought. Upon stable input/output speed information the gear ratio can accurately assessed. From this gear ratio, it is known which offending clutch is involved with the primary clutch. If the gear ratio does hold upon decreasing $P_{SEC}$, $P_{SEC}$ is set to a value just below $P_{SLIP}$, enabling the secondary element to start slipping.

If the gear ratio holds upon decreasing $P_{SEC}$ to just below $P_{SLIP}$, (i.e., the TOSS stops decelerating), the offending element is one that is associated with a higher gear ratio. $P_{SEC}$ is reduced to zero (i.e., 0 kPA), which effectively results in a gear ratio shift to a higher gear ratio. The transmission clutch control can identify the offending element, as discussed above. If the gear ratio does not hold upon decreasing $P_{SEC}$ to just below $P_{SLIP}$, there is no fault and PSEC is set equal to the normal engagement pressure ($P_{ENGAGE}$).

The transmission clutch control sets a diagnostic trouble code (DTC) corresponding to a particular transmission element or elements deemed to be defective. A technician can readily identify the defective component by reading the DTCs. In this manner, the transmission can be easily and effectively repaired, decreasing warranty and other associated costs.

Figure 2:
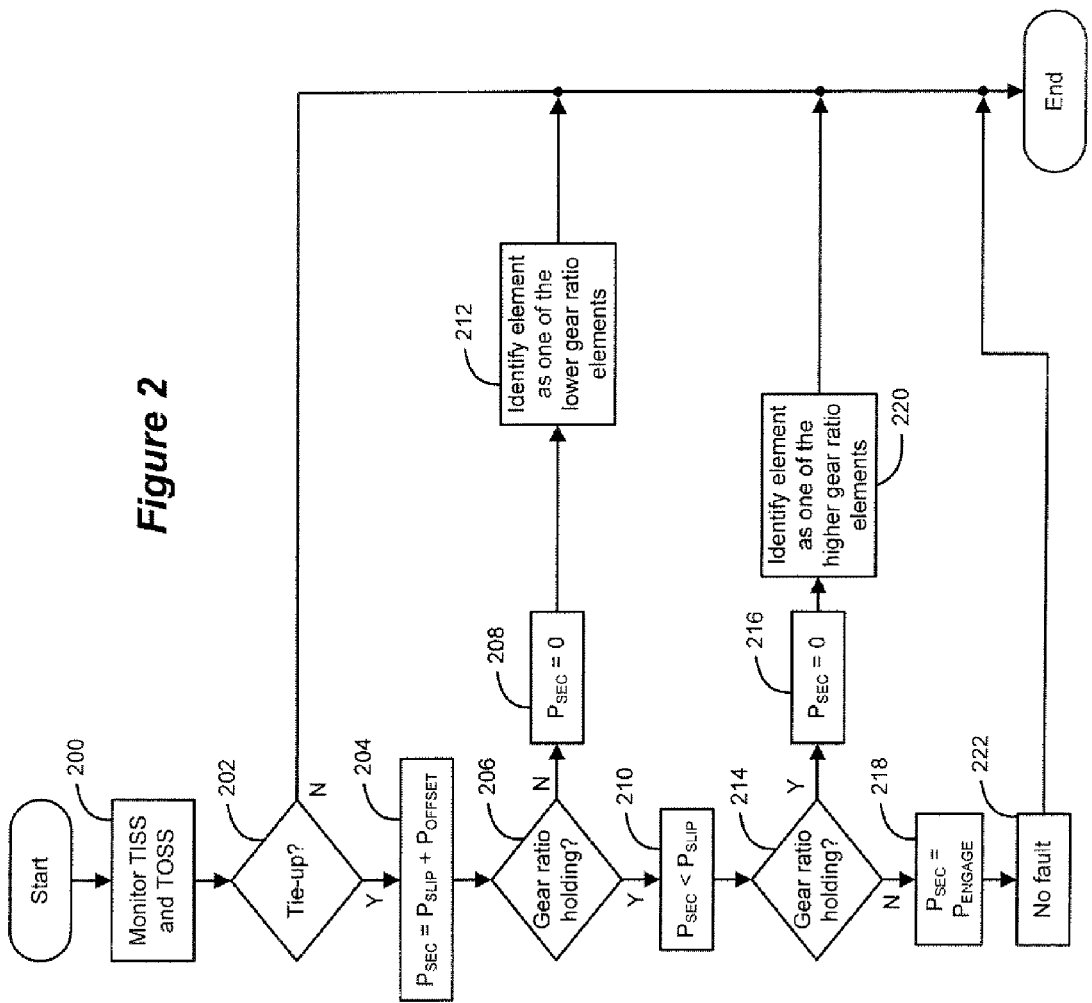
FIG. 2 is a flowchart illustrating exemplary steps executed by the transmission clutch control of the present disclosure.

Referring now to FIG. 2, exemplary steps that are executed by the transmission clutch control of the present invention will be described in detail. In step 200, control monitors TISS and TOSS. In step 202, control determines whether a tie-up condition exists. If a tie-up condition does not exist, control ends. If a tie-up condition does exist, control continues in step 204. In step 204, control sets $P_{SEC}$ equal to $P_{SLIP}$ and $P_{OFFSET}$.

Control determines whether the gear ratio is holding in step 206. If the gear ratio is not holding, control continues in step 208. If the gear ratio is holding, control continues in step 210. In steps 208 and 210, control sets $P_{SEC}$ equal to zero and identifies the offending clutch element and control ends. In step 210, control sets $P_{SEC}$ to a value just below $P_{SLIP}$.

Control determines whether the gear ratio is holding in step 214. If the gear ratio is holding, control continues in step 216. If the gear ratio is not holding, control continues in step 218. In steps 216 and 220, control sets $P_{SEC}$ equal to zero and identifies the offending clutch element and control ends. In step 218, control sets $P_{SEC}$ equal to $P_{ENGAGE}$. Control indicates that there is no fault in step 222 and control ends.

Figure 3:
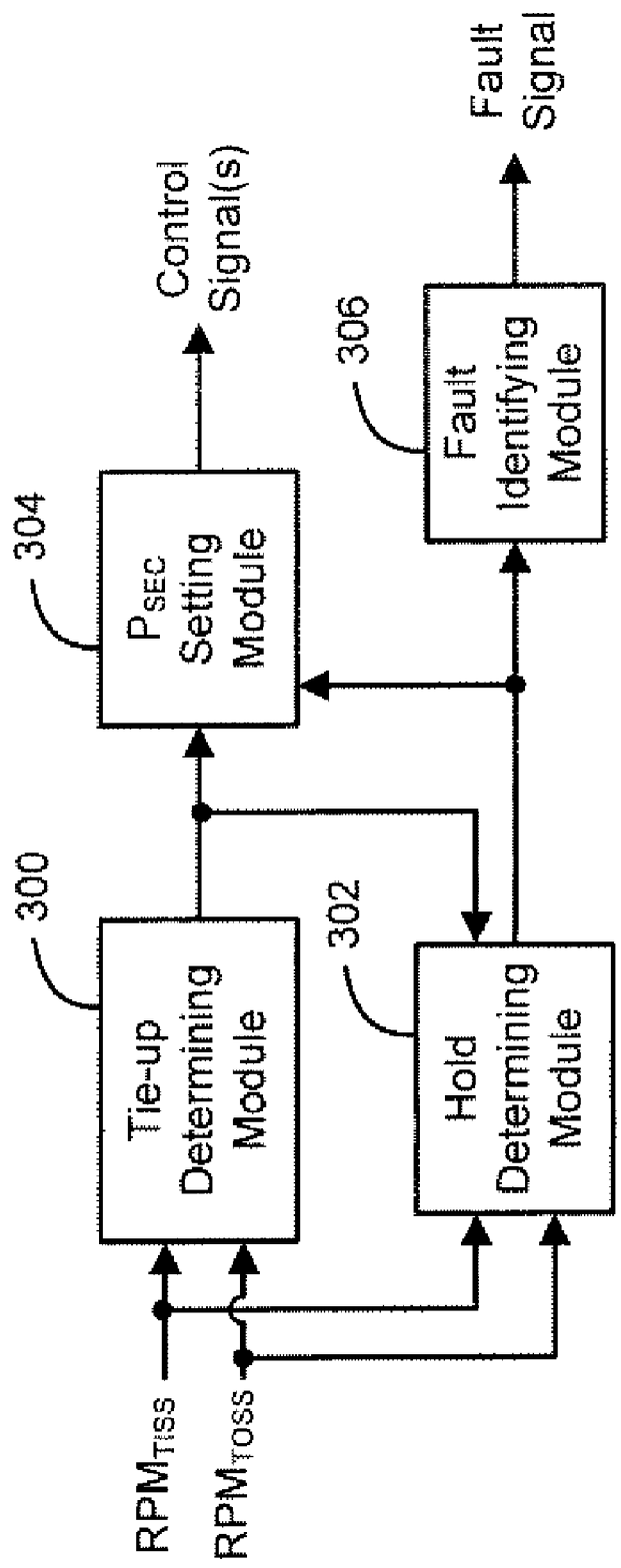
FIG. 3 is a functional block diagram of exemplary modules that execute the transmission clutch control of the present disclosure.

Referring now to FIG. 3, exemplary modules that execute the transmission slip control will be described in detail. The exemplary modules include a tie-up determining module 300, a hold determining module 302, a $P_{SEC}$ setting module 304 and a fault identifying module 306. The tie-up determining module 300 determines whether a tie-up condition exists based on $RPM_{TISS}$ and $RPM_{TOSS}$. The hold determining module 302 determines whether the gear ratio holds during the various steps of the transmission clutch control based on $RPM_{TISS}$ and $RPM_{TOSS}$ and a tie-up condition signal from the tie-up determining module. The $P_{SEC}$ setting module selectively sets $P_{SEC}$ in accordance with the transmission clutch control based on the tie-up condition signal and a hold signal. The fault identifying module 306 identifies a fault condition or a no fault condition in accordance with the transmission clutch control based on the hold signal.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A transmission control system for an automatic transmission, comprising:
    a first module that identifies a tie-up condition of the automatic transmission;
    a second module that adjusts a pressure of a transmission element in response to said tie-up condition;
    a third module that determines whether a first gear ratio of the automatic transmission holds, wherein said second module sets said pressure to zero if said gear ratio does not hold; and
    a fourth module that identifies a faulty transmission element as one associated with a second gear ratio that is lower than said first gear ratio.

2. The transmission control system of claim 1 wherein:
    said second module sets said pressure of said transmission element to a value just below a slip pressure of said transmission element if said first gear ratio holds;
    said third module again determines whether said first gear ratio of the automatic transmission holds, wherein said second module sets said pressure to zero if said gear ratio does hold; and
    said fourth module identifies a faulty transmission element as one associated with a second gear ratio that is higher than said first gear ratio.

3. The transmission control system of claim 2 wherein:
    said second module sets said pressure to an engagement pressure if said gear ratio does not hold; and
    said fourth module indicates a no fault condition of said automatic transmission.

4. The transmission control system of claim 1 wherein said second module determines a slip pressure of said transmission element, determines an offset pressure and sets said pressure of said transmission element to said slip pressure plus said offset pressure in response to said tie-up condition.

5. The transmission control system of claim 1 wherein first module monitors a transmission input shaft speed, monitors a transmission output shaft speed and identifies said tie-up condition based on said transmission input shaft speed and said transmission output shaft speed.

6. A method of regulating operation of an automatic transmission, comprising:
    identifying a tie-up condition of the automatic transmission;
    adjusting a pressure of a transmission element in response to said tie-up condition;
    determining whether a first gear ratio of the automatic transmission holds;
    setting said pressure to zero if said gear ratio does not hold; and
    identifying a faulty transmission element as one associated with a second gear ratio that is lower than said first gear ratio.

7. The method of claim 6 further comprising:
    setting a pressure of said transmission element to a value just below a slip pressure of said transmission element if said first gear ratio holds;
    again determining whether said first gear ratio of the automatic transmission holds;
    setting said pressure to zero if said gear ratio does hold; and
    identifying a faulty transmission element as one associated with a second gear ratio that is higher than said first gear ratio.

8. The method of claim 7 further comprising:
    setting said pressure to an engagement pressure if said gear ratio does not hold; and
    indicating a no fault condition of said automatic transmission.

9. The method of claim 6 wherein said adjusting said pressure includes:
    determining a slip pressure of said transmission element;
    determining an offset pressure; and
    setting said pressure of said transmission element to said slip pressure plus said offset pressure.

10. The method of claim 6 further comprising:
    monitoring a transmission input shaft speed;
    monitoring a transmission output shaft speed; and
    identifying said tie-up condition based on said transmission input shaft speed and said transmission output shaft speed.

11. A method of regulating operation of an automatic transmission, comprising:
    identifying a tie-up condition of the automatic transmission;
    determining a slip pressure of a transmission element;
    adjusting a pressure of said transmission element to a pressure just above said slip pressure in response to said tie-up condition;
    determining whether a first gear ratio of the automatic transmission holds;
    setting said pressure to zero if said gear ratio does not hold;
    identifying a faulty transmission element as one associated with a second gear ratio that is lower than said first gear ratio;
    wherein said pressure just above said slip pressure is determined as a sum of said slip pressure and an offset pressure.

12. The method of claim 11 further comprising:
    setting a pressure of said transmission element to a pressure just below said slip pressure of said transmission element if said first gear ratio holds;
    again determining whether said first gear ratio of the automatic transmission holds;
    setting said pressure to zero if said gear ratio does hold; and
    identifying a faulty transmission element as one associated with a second gear ratio that is higher than said first gear ratio.

13. The method of claim 12 further comprising:

setting said pressure to an engagement pressure if said gear ratio does not hold; and indicating a no fault condition of said automatic transmission.

14. The method of claim 11 further comprising determining said offset pressure as a pre-stored value.

15. The method of claim 11 further comprising:

monitoring a transmission input shaft speed;

monitoring a transmission output shaft speed; and identifying said tie-up condition based on said transmission input shaft speed and said transmission output shaft speed.

* * * * *